(12) United States Patent
Giorgi et al.

(10) Patent No.: US 7,057,214 B2
(45) Date of Patent: Jun. 6, 2006

(54) LIGHT-ACTIVATED SEMICONDUCTOR SWITCHES

(75) Inventors: David M. Giorgi, Solana Beach, CA (US); Tajchai Navapanich, San Diego, CA (US)

(73) Assignee: Optiswitch Technology Corporation, San Diego, CA (US)

( * ) Notice: Subject to any disclaimer, the term of this patent is extended or adjusted under 35 U.S.C. 154(b) by 210 days.

(21) Appl. No.: 10/611,447

(22) Filed: Jul. 1, 2003

(65) Prior Publication Data

US 2005/0001332 A1     Jan. 6, 2005

(51) Int. Cl.
  *H01L 29/417*  (2006.01)
  *H01L 29/74*   (2006.01)
  *H01L 31/111*  (2006.01)

(52) U.S. Cl. .............. 257/118; 257/113; 257/114; 257/115; 257/116; 257/117; 257/918

(58) Field of Classification Search ........ 257/113–118, 257/918
See application file for complete search history.

(56) References Cited

U.S. PATENT DOCUMENTS

| | | | | |
|---|---|---|---|---|
| 3,590,344 A | | 6/1971 | Roberts et al. ............. 257/116 |
| 3,697,833 A | * | 10/1972 | Nakata ..................... 257/118 |
| 3,961,354 A | * | 6/1976 | Kuwagata et al. ......... 257/129 |
| 3,972,014 A | * | 7/1976 | Hutson ..................... 257/128 |
| 4,079,407 A | * | 3/1978 | Hutson ..................... 257/120 |
| 4,186,409 A | | 1/1980 | McMullin .................. 257/117 |
| 4,190,853 A | * | 2/1980 | Hutson ..................... 257/120 |
| 4,216,487 A | * | 8/1980 | Konishi et al. ............. 257/117 |
| 4,219,833 A | | 8/1980 | Temple ..................... 257/115 |
| 4,261,001 A | * | 4/1981 | Temple ..................... 257/115 |
| 4,286,279 A | * | 8/1981 | Hutson ..................... 257/120 |
| 4,301,462 A | * | 11/1981 | Lowry ...................... 257/117 |
| 4,370,180 A | * | 1/1983 | Azuma et al. .............. 438/139 |
| 4,441,115 A | * | 4/1984 | Dahlberg ................... 257/107 |
| 4,497,109 A | | 2/1985 | Huber et al. ............... 438/135 |
| 4,572,947 A | | 2/1986 | Kao et al. .................. 257/118 |

(Continued)

FOREIGN PATENT DOCUMENTS

DE        002738160        3/1979

(Continued)

OTHER PUBLICATIONS

Alferov et al., "Electrically controllable three-electrode high-voltage subnanosecond switches made from a mulitlayer GaAs-AlGaAs heterostructure", *Sov. Tech Phys Lett.* Nov., 1986, American Institute of Physics, pp. 529-530.

(Continued)

*Primary Examiner*—Ida M. Soward
(74) *Attorney, Agent, or Firm*—Altera Law Group, LLC

(57) ABSTRACT

Semiconductor switches, such as thyristors, may be light activated by introducing the light into the switch via a groove having a sloped surface to receive the triggering light. The use of a sloped surface increases the surface path length between points of different electrical potential in the groove and, therefore, reduces the likelihood of electrical breakdown on the groove wall. In one particular embodiment, a light-activated thyristor includes a semiconductor anode layer, an n-base layer, a p-base layer and a semiconductor cathode layer disposed parallel to a thyristor plane. A thyristor axis lies perpendicular to the thyristor plane. A groove having a light refracting side wall extends into the thyristor from the anode layer. A portion of the light refracting side wall is disposed non-parallel to the thyristor plane and to the thyristor axis, and extends in the n-drift layer.

53 Claims, 12 Drawing Sheets

U.S. PATENT DOCUMENTS

| | | | |
|---|---|---|---|
| 4,613,884 A * | 9/1986 | Angerstein et al. | 257/115 |
| 4,719,551 A * | 1/1988 | Nishizawa et al. | 363/41 |
| 4,866,500 A * | 9/1989 | Nishizawa et al. | 257/114 |
| 4,908,687 A | 3/1990 | Temple | 257/115 |
| 4,910,571 A * | 3/1990 | Kasahara et al. | 257/94 |
| 5,017,991 A | 5/1991 | Nishizawa et al. | 257/114 |
| 5,637,886 A * | 6/1997 | Satoh et al. | 257/107 |
| 5,747,835 A | 5/1998 | Pezzani | 257/113 |
| 6,218,682 B1 | 4/2001 | Zucker et al. | |
| 6,489,177 B1 * | 12/2002 | Inomoto | 438/31 |
| 6,770,911 B1 * | 8/2004 | Agarwal et al. | 257/77 |

FOREIGN PATENT DOCUMENTS

| | | |
|---|---|---|
| JP | 353112682 | 10/1978 |
| JP | 356152266 | 11/1981 |
| JP | 357196567 | 12/1982 |
| JP | 407015004 A | 1/1995 |

OTHER PUBLICATIONS

Carson et al., "Long switching delay mechanisms for optically triggered GaAs thyristors", Appl. Phys. Lett. Aug. 1991, American Institute of Physics, pp. 834-836.

Long et al., "New experiments with Light Activated Silicon Switches", Appl. Phys. Lett., Dec. 27, 1977, pp. 1-3.

Page, "Some Advances in High Power, High dI/dt, Semiconductor Switches", Energy Storage, Compression and Switching, 1976, pp. 415-421.

Zhao et al., Dynamic I-V Characteristics of an AlGaAs/GaAs-Based Optothyristor for Pulsed Power-Switching Applications, IEEE Electronic Device Letters, vol. 13, No. 3, Mar. 1992, pp. 161-163.

Zhao et al., "Using Reverse Dynamic I-V Characteristics of AlGaAs/GaAs Optothyristor for Pulsed Power-Switching Applications", Electronics Letters, May 21, 1992, vol. 28, No. 11, pp. 977-978.

Zucker et al., "Experimental demonstration of high-power fast-rise-time switching in silicon junction semiconductors", Applied Physics Letters, vol. 29, No. 4, Aug. 15, 1976, pp. 261-263.

"Proceedings: Light-Fired Thristor Workshop", Mar. 1978, Electric Power Research Institute, Palo Alto, California.

* cited by examiner

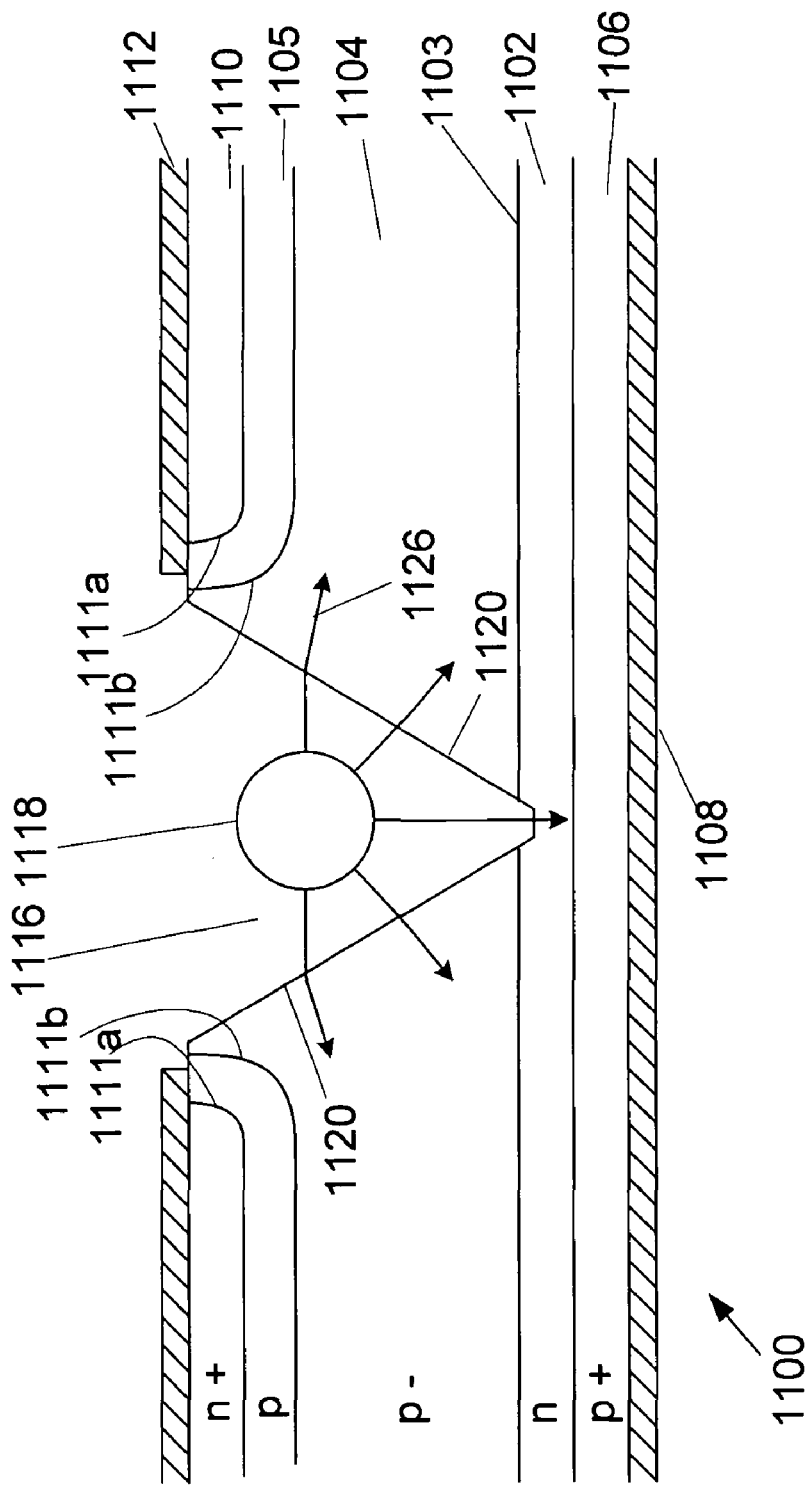

LIGHT-ACTIVATED SEMICONDUCTOR SWITCHES

FIELD OF THE INVENTION

The present invention is directed generally to high power semiconductor devices and more particularly to a semiconductor switch that is activated by light.

BACKGROUND

The thyristor is a high power semiconductor switch that permits large currents to be switched at high voltages. The thyristor has four semiconducting layers. Typically, the two outer layers are heavily doped layers, while the inner two are lightly doped. Adjacent layers are oppositely doped from their neighbors, forming a number of semiconductor junctions therebetween.

The thyristor is turned on when carriers enter one of the inner layers. Typically, this is performed by injecting a small gate current pulse into one of the inner layers. Where the gate current is injected over only a portion of the inner layer, the current through the thyristor does not reach a maximum value until the entire layer is conducting. The time taken for the current to spread laterally to fill the layer is limited by the local carrier gradient. The device only reaches full current capacity after the current has spread sufficiently to uniformly saturate the device. One approach to reducing the turn on time is to inject the gate current over a large area of the thyristor, which necessitates a high degree of interdigitization between the gate electrode and the cathode electrode. An increased gate electrode area results in a reduced active area on the wafer for carrying the high current.

Another method of turning on a thyristor is to rapidly change the anode voltage with time. When the anode voltage is rising rapidly a current flows through the device because of its capacitance. This current can be sufficient to turn the device on. This triggering method, however, is less controllable than gate current injection because the device can turn on in a small area, due to inhomogeneities in the semiconductor. The entire anode current flowing through the small conducting region produces excess power dissipation leading to device failure.

A third method for turning on a thyristor is to create charge carriers in the center junction through the absorption of light. Past attempts at light activation of a thyristor have included illuminating a portion of the thyristor with light transmitted from the end of a fiber. This also results in the turn-on time of the thyristor being limited by the lateral spreading of the on-region.

The illumination of a thyristor through the side of a fiber results in the illumination of a greater volume of the device, resulting in the generation of charge carriers throughout a larger fraction of the device, and so the device can reach its maximum current carrying capability more quickly.

SUMMARY OF THE INVENTION

Illumination of a semiconductor switch device through the side of a light guide can be achieved by forming a groove in the switch and illuminating the groove using a light guide. The light guide may be disposed within the groove. It is often advantageous to form the groove sufficiently deep into the switch so that the light enters the semiconductor close to the main junction between the relatively thick n-region and the p-base. The n region of the switch may be uniformly doped, for example as in a symmetrical thyristor or diode or may be composed of two distinct regions, for example as in an asymmetrical thyristor or p-i-n diode. The two regions include a low-doped n-drift region over which most of the voltage is held and an n-buffer region which, in the case of the thyristor, prevents the field from penetrating to the anode.

Forming a groove deep into the semiconductor material of the switch, however, may result in the reduction of the voltage holding of the device, thus compromising its electrical performance. There is a need, therefore, for an approach that permits light activation of the switch, in which the light is able to reach the region over which the voltage is held, without reducing the voltage holding capabilities.

Accordingly, one aspect of the invention is directed to the use of sloped surfaces in the grooves that receive the optical fiber or the light therefrom. The use of a sloped surface increases the length of the surface path between points of different electrical potential in the groove, thus reducing the electric field along the groove and, therefore, permits the thyristor to operate closer to its theoretical breakdown voltage.

In particular, one embodiment of the invention is directed to a light-activated semiconductor switch device. A semiconductor switch comprises a first n-doped layer and a first p-doped layer forming a switch blocking junction. A switch axis lies perpendicular to the switch blocking junction. A groove having a light refracting side wall extends into the first n-doped layer from a side opposite from the switch blocking junction. At least a portion of the light refracting side wall is disposed non-parallel to the switch plane and to the switch axis.

Another embodiment of the invention is directed to a method of controlling a semiconductor switch having a first p-doped layer and a first n-doped layer forming a switch blocking junction, the switch blocking junction being substantially perpendicular to a switch axis. The method comprises refracting light absorbable by the switch at a side wall of a groove in the switch, the side wall being disposed at least in the first n-doped layer and at a non-zero angle relative to the switch blocking junction and to the switch axis.

Another embodiment of the invention is directed to a light-activated semiconductor switch device. The device comprises a switch comprising a first n-doped layer and a first p-doped layer forming a switch blocking junction. The switch has an edge portion with a beveled edge surface. A light source directs light into the switch at the edge portion so as to internally reflect the light at the beveled edge surface.

Another embodiment of the invention is directed to a method of controlling a semiconductor switch having a switch blocking junction formed by a first p-doped layer and a first n-doped layer, the switch having a beveled edge. The method comprises passing light through a face of the semiconductor switch, and totally internally reflecting the light by the beveled edge.

Another embodiment of the invention is directed to a light-activated thyristor device. The device comprises a thyristor comprising, in order from an anode side, a semiconductor anode layer, an n-drift layer, a p-base layer and a semiconductor cathode layer. A groove extends into the thyristor through at least one of the anode layer and the cathode layer. An edge of the at least one of the anode layer and the cathode layer, through which the groove extends, does not extend to a wall of the groove.

Another embodiment of the invention is directed to a light activated semiconductor switch that has a first n-doped layer and a first p-doped layer forming a switch blocking junction. A groove having a light refracting side wall extends into one of the first n-doped and first p-doped layers from a side of the one of the first n-doped and first p-doped layers opposite from the switch blocking junction. When the groove extends into the first n-doped region, the first n-doped layer comprises a high n-doped region separated from the first p-doped layer by a low n-doped region, the low n-doped region extending between the high n-doped region and the groove. When the groove extends into the first p-doped region, the first p-doped layer comprises a high p-doped region separated from the first n-doped layer by a low p-doped region, the low p-doped region extending between the high p-doped region and the groove.

Another embodiment of the invention is directed to a light-activated semiconductor switch device, that includes a semiconductor switch having a first n-doped layer and a first p-doped layer forming a switch blocking junction. A groove having a light refracting side wall extends through one of the first n-doped layer and the first p-doped layer and extends into the other of the first n-doped layer and the first p-doped layer.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 11 schematically illustrates another embodiment of an optically activated semiconductor switch, according to principles of the present invention.

Figure 1:
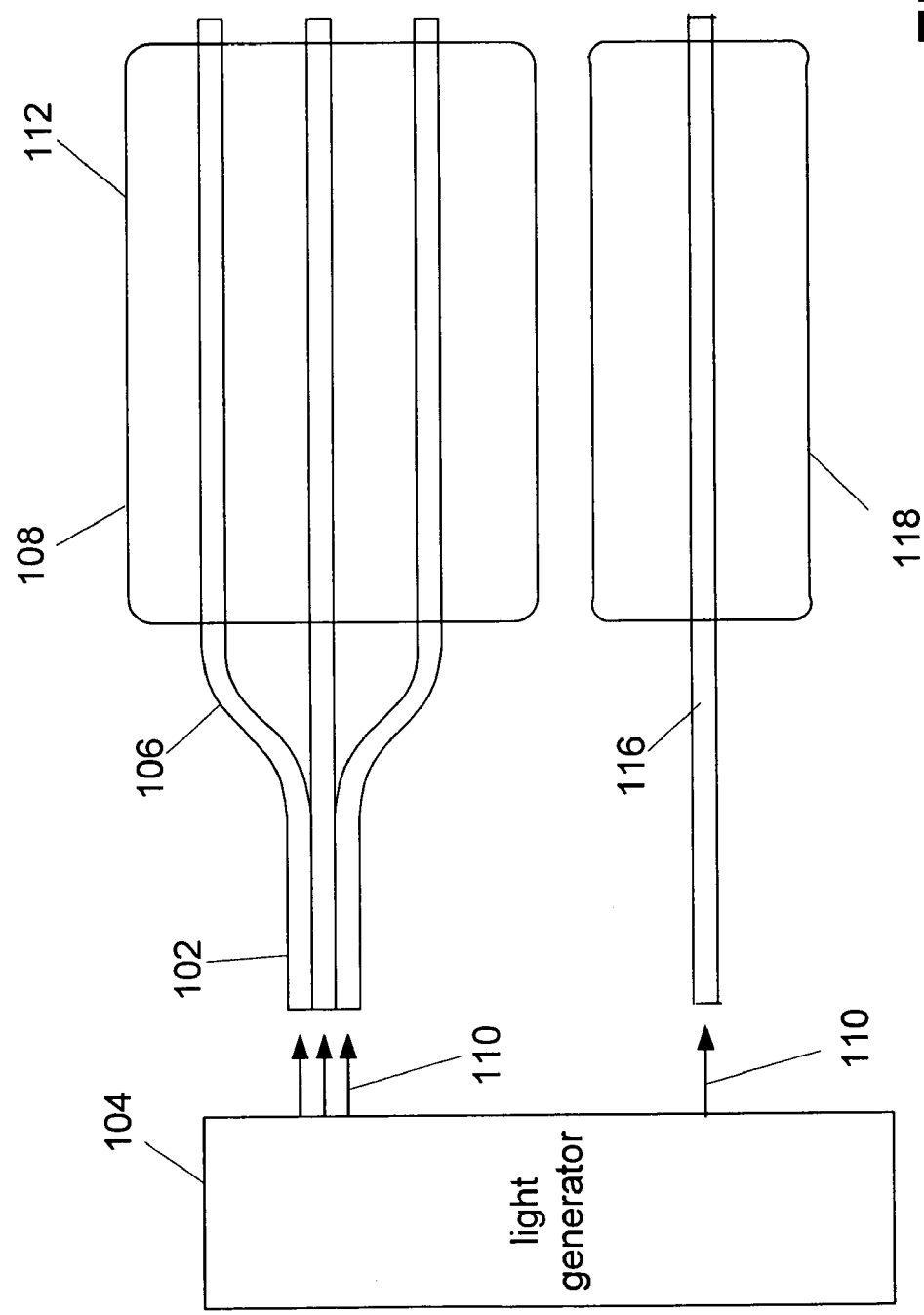
FIG. 1 schematically illustrates an embodiment of a light-activated thyristor system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to light-activated semiconductor switches, and more particularly to an approach to activating a semiconductor switch using light that permits fast turn on to high current levels, while at the same time maintaining high voltage hold off.

The semiconductor devices described here are based on the use of optical triggering to actively switch the semiconductor switch into a conducting state. Optical activation involves illuminating the semiconductor switch with light. The light is absorbed within the semiconductor switch, resulting in the production of electron-hole pairs at the site of absorption. Thus, optical activation permits the direct generation of carrier pairs within the device, and does not require the injection of carriers into the device. Hence, optical activation can create carriers within the device considerably faster than injection, which process is limited in speed by the carrier drift velocity. Optical activation can be used for switching on semiconductor devices by creating a population of carriers, for example, within a junction.

Judicious selection of the wavelength of the activating light results in the ability to control the absorption depth, and hence the volume of semiconductor material activated by the optical pulse. This permits the fraction of wafer area devoted to light activation to be reduced relative to that required for electrical activation, and hence the fraction of wafer area used for carrying the high current is increased. In addition, uniform illumination of the device presents the possibility of combining fast turn-on times with large current carrying capacity.

Different types of semiconductor switch devices may be used with the present invention, including structures having one, two, three or even more semiconductor junctions. Examples of semiconductor devices that may be used with the present invention include diodes, junction transistors and thyristors. Several examples are now discussed with respect to use in a thyristor, but it should be realized that the principles of the invention are also applicable to other types of optically activated semiconductor switches.

One particular embodiment of a light-activated thyristor system 100 is schematically presented in FIG. 1. The input to a fiber optic bundle 102 is illuminated with light 110 from a light generator 104. Individual optical waveguides 106, such as optical fibers from the fiber optic bundle 102 are placed across the thyristor 108 so that light leaking out the side of the fibers illuminates the thyristor 108. The light 110 is selected to be of a wavelength that is absorbed within the thyristor 108. For example, if the thyristor is based on silicon, having a band-gap at about 1.1 eV, the wavelength of the light illuminating the thyristor is less than about 1.2

μm. The semiconductor material typically has a sharp absorption band edge, and adjustment of the frequency of the activating light relative to the band edge results in a change in the absorption depth.

The light generator used to activate the thyristor 108 may include any type of optical source that can produce optical pulses at the desired energy level and having the desired wavelength and pulse duration. One such type of light generator is the diode-laser pumped $Nd^{3+}$ solid state laser. $Nd^{3+}$ lasers, such as those based on the use of YAG, YLF and $YVO_4$ crystalline hosts, show significant wavelength match to the absorption band edge of silicon for effective optical absorption throughout the device. A Nd:YAG laser, for example, has a laser line at a wavelength of approximately 1.06 μm, which corresponds to an absorption depth in silicon of about 1 mm. Therefore, the separation between the optical fibers 106 may be in the range 1–3 mm, which is a distance considerably greater than the typical interdigitization distance for electrodes on conventional thyristor devices.

It will be appreciated that different types of laser source may be used for optical activation of the thyristor, such as laser diodes. The emission wavelength of the laser diode may be set by selection of the band gap in the laser diode. Fine control of the absorption depth may also be achieved by temperature controlling the semiconductor device. The laser may be a diode array, having an array of emitters. In such a case, the light guide 106 may include an array of fibers matched to receive the light output from respective emitters.

Under optical activation, the rate of current rise, dI/dt, is typically higher than with conventional switches, the planar geometry is maintained to withstand high applied voltages, and more wafer area can be preserved for carrying high current.

In the illustrated embodiment, the optical fibers 106 are treated so that the light propagating within the fibers 106 leaks out along the length of the thyristor 108 being illuminated. Optical fibers 106 may be treated in many different ways to achieve the desired amount of light leakage. One method is to etch the core of the fiber with an etchant. The optical fibers 106 are typically multiple mode fibers and, in one particular embodiment, may have a core diameter in the range 10 μm–400 μm, although the core diameters are not restricted to this range. In the illustrated embodiment, there are multiple optical fibers associated with the thyristor 108.

The thyristor 108 may have any suitable shape of cross-section in the current-carrying direction. In the illustrated embodiment, the thyristor is substantially rectangular, but may also be, for example, circular or some other shape. The corners of the thyristor 108 may be rounded to avoid field concentration at the corners. The edges 112 of the thyristor 108 are typically beveled and passivated so as to increase the voltage holding capabilities of the device between the two surfaces of the thyristor 108.

The same light generator 104 may also illuminate a second semiconductor switch 118 via a second light guide 116. Thus, one light source may illuminate several light guides for a single switch, and/or may illuminate more than one semiconductor switch.

Figure 2:
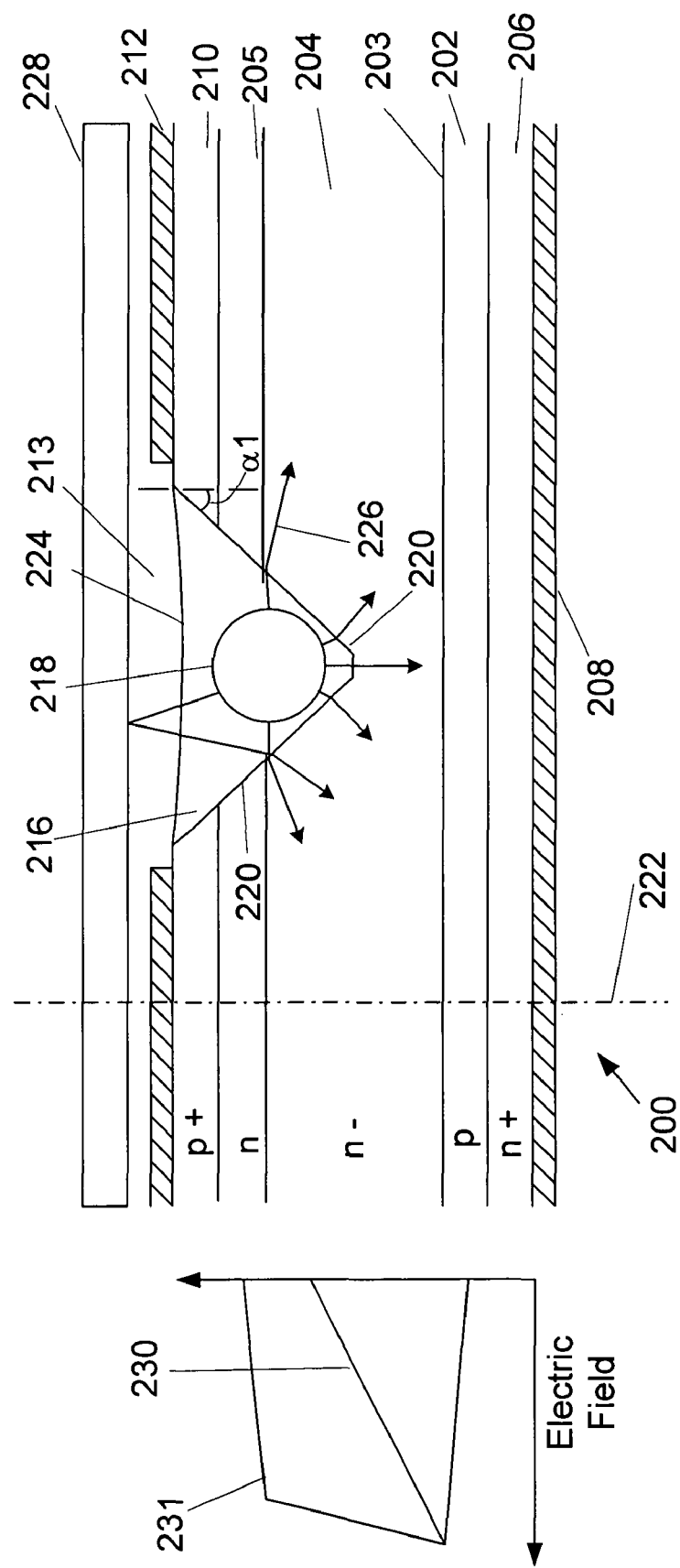
FIG. 2 schematically illustrates a cross-section through an embodiment of a light-activated thyristor with refractive direction of the triggering light, according to the present invention.

An example of a partial cross-section through one embodiment of a semiconductor switch 200 is schematically illustrated in FIG. 2. The switch 200, in this case a thyristor, has a p-type base layer 202 and an n-type drift layer 204, also referred to as an n-base layer. The main blocking junction 203 is formed between the p-base layer 202 and the n-drift layer 204. The main blocking junction 203 is the junction that blocks the flow of current when the switch 200 is in the open, or forward blocking, condition.

An n-type emitter layer 206, also referred to as a semiconductor cathode layer, formed of n+ doped material, forms a junction with the other side of the p-base layer 202 and is connected to the cathode electrode 208, typically a metallic layer deposited on the n+ emitter layer 206. The p+ semiconductor anode layer 210 lies above the n-drift layer 204. The p+ anode layer 210 is overcoated with, for example, a metallic layer, that forms the anode electrode 212. The cathode electrode 208 and the anode electrode 212 may be formed from nickel/gold, titanium/nickel/gold, aluminum, or other suitable metals or alloys used for electrodes on semiconductor devices. An aperture 213 in the anode electrode 212 may be provided to receive light into the thyristor 200 for activation to the conducting on-state.

The n-drift layer 204 may include an n-buffer layer 205 close to the anode layer 210. The n-buffer layer 205 typically has a higher doping concentration than the remainder of the n-drift layer 204. Where an n-buffer layer 205 is present, the thyristor 200 is referred to as an asymmetric thyristor. Where the n-buffer layer 205 is not present, the thyristor 200 is referred to as a symmetric thyristor. The other embodiments illustrated below are shown as symmetric thyristors. This is not intended to be limiting, and the other embodiments may also be either symmetric or asymmetric thyristors.

Although the term layer is used herein to describe the various layers of the thyristor device, it will be appreciated that not all layers need be continuous. For example, the semiconductor cathode and/or anode layers 206 and 210 may be formed of discrete regions, rather than continuous layers running across the entire thyristor 200.

The p-base layer 202 and the n-drift layer 204 form a blocking junction 203 between each other. This blocking junction 203 is usually reverse-biased when the thyristor 200 holds off a high voltage. The n+ emitter layer 206 forms a diode junction, commonly called an injection diode or base-emitter junction, with the p-base layer 202. Likewise, the p+ anode layer 210 forms a diode junction (injection diode) with the n-drift layer 204. It will be appreciated that the presence of n-p and p-n junctions enables the device to hold off an applied voltage of either polarity.

Before describing how the optically activated thyristor operates, it is useful first to consider turn-on in a conventional thyristor. The turn-on process in a conventional four-layer device requires a critical carrier concentration to be generated at the blocking junction. This is typically achieved by applying a gate current pulse to the p-base layer to produce the injection of electrons from the n+ emitter layer into the p-base layer. The conventional turn-on process proceeds in two stages. First, the injection of carriers into the blocking junction region collapses the voltage by turning the device on in a small fraction of the device area. The thyristor may be viewed as a pair of interleaved transistors. Injection of carriers into the blocking junction results in turning on the first transistor of the transistor pair, and thus the second transistor latches on in the thyristor fashion. Subsequently, the device turns on through lateral spreading of the current, which is a relatively slow process, proceeding at a rate of approximately 50 μm/μs.

The greater the interdigitization of the gate electrode in the conventional device, the shorter the distance required for lateral current spreading and so the device turns on faster, i.e. it has a higher dI/dt. The competition for surface area between the emitter and the gate trades off speed against current-carrying capability. Optical activation is even more important for higher voltage devices where the thicker n region, necessary for increasing the voltage holding, reduces the lateral spreading velocity.

In the optically activated thyristor, an optical pulse is transmitted, typically via an optical waveguide such as a fiber, to initially create a dense electron and hole plasma throughout the device. The activating light may be transmitted through the aperture 213, or may be introduced through the aperture 213 by a light guide, such as an optical fiber.

The active turn-on process using optical activation is fundamentally different from conventional thyristors because the in situ creation of carriers does not need to rely on a meaningful lateral spreading velocity to turn on the entire device. The depletion layer to be collapsed in the turn-on process is supported by a background doping density which typically in the range $10^{12}$–$10^{13}$ cm$^{-3}$. The concentration of optically generated carriers is typically four to six factors of 10 higher in magnitude. Thus, as soon as the carrier concentration is established within the device through light absorption, a small rearrangement of the generated carriers cancels the electric field across the depletion region. This process may take place in the picosecond regime and, therefore, the voltage collapse may be regarded as occurring at the same rate at which light is supplied to the device.

In the illustrated embodiment, the thyristor 200 is provided with a groove 216 at the aperture 213. The groove 216 passes through the p+ anode layer 210 and into the n-drift layer 204. A light guide 218, for example an optical fiber, may be provided within the groove 216. The light propagating along the light guide 218 leaks through the light guide wall, enters the thyristor 200 and is absorbed in the semiconductor material of the thyristor 200 to generate electron hole pairs.

The groove 216 has side walls 220 having linear portions that are angled relative to the axis 222 of the thyristor 200. The axis 222 is perpendicular to the planar thyristor layers. The angle, α1, of the groove walls 220 to the axis 222 may be any suitable value, but is preferably above 5°, and is more preferably in the range 10°–45°.

An important feature of the invention is that the groove 216 extends from the anode side of the thyristor 200, into the n-drift layer 204. The n-drift layer 204 is typically thick relative to the other layers. For example, in one embodiment, the n-drift layer is about 2.3 mm thick, whereas the p-base layer 202 is in the range from about 50 μm to about 100 μm thick, the semiconductor cathode and anode layers 206 and 210 are only a few μm thick. The profile of the electric field through the thyristor 200, when the thyristor is off, is schematically illustrated in graph 230. Graph 230 shows the electric field profile for a symmetric thyristor. Graph 231, for an asymmetric thyristor having an n-buffer layer, shows that the electric field extends through the n-drift layer 204 and into the n-buffer layer 205.

By extending the groove 216 from the anode side of the thyristor into the n-drift layer 204, the activating light may be transmitted directly into in a region of the thyristor 200 where the electric field is relatively high. Light activation of the high-field region of the thyristor 200 results in a rapid rise of current density, measured in terms of dJ/dt, where J is the current density and t is the time. The values of dJ/dt achievable when the high field region of the n-drift layer 204 is optically activated are higher than when the light is introduced through the cathode side of the thyristor.

In contrast, where the grooves for coupling the light are placed on the cathode side of the device, the breakdown voltage is significantly reduced if the groove penetrates the p-base/n-drift junction unless the groove angle is 88–89°. Such a groove angle is very shallow and would take up a large portion of the cathode area. On the other hand, if the cathode-side groove has a wall angle of around 45° or so, the groove cannot penetrate the high field region, due to the increased electric field on the groove wall, and so the cathode-side groove is very shallow. This means that the spacing between the cathode-side grooves must be less for good illumination. Also the shallow groove limits the size of the fiber.

Another advantage of having the groove extend from the anode side of the thyristor is that the groove wall 220, also referred to as a bevel, is a positive bevel, which is also the type of bevel typically used along the edges of the thyristor 200. The result of using a positive bevel is that the electric field strength along the surface of the wall 220 is less than the electric field strength within the thyristor 200. Thus, the thyristor may still be operated at high voltage with reduced probability of electrical breakdown along the groove wall 220. Consequently, the groove 216 may extend very deep into the thyristor 200, even through the junction 203 to the p-base layer 202. If, on the other hand, the groove were to extend from the cathode side of the thyristor, the resulting bevel would be a negative bevel, in which the electric field strength along the groove wall would be higher than the field strength within the device. The concomitant reduced breakdown voltage of the groove reduces the operating voltage of the thyristor.

In addition to reducing the electric field along the surface of the groove 216, the angled wall 220 may also be used to direct light from the light guide 218 in a direction along the n-drift layer 204. This spreads the light along the thyristor 200 from the light guide 218, and thus enables the light guides 218 to be placed further apart along the thyristor 200.

The groove 216 may be formed using any suitable technique. For example, the groove 216 may be etched using an anisotropic etch: etching silicon with potassium hydroxide (KOH) results in the formation of sidewalls that are about 35.3° from the thyristor axis. In another example, the groove may be formed using a dicing blade or saw having an appropriately shaped edge. After formation, the side walls 220 of the groove 216 may be passivated, for example with a coating of polyimide.

The groove 216 may be back-filled with a material 224 that is substantially transparent to the light 226 transmitted from the light guide 218 to the thyristor 200. One example of such material is a polyimide, and may be the same type of polyimide as used to passivate the side walls 220. A plate 228 that reflects the light emitted by the optical light guide 218 in the upwards direction may be disposed above the groove 216 so as to reflect light back to the side walls 220 that would otherwise escape from the thyristor. This helps to increase the optical efficiency of the light triggering process. The reflector may be, for example, formed from silicon, metal, or a dielectric material, with a reflective coating to enhance the reflectivity of the light. That portion of the plate 228 not directly above the groove 216 may be formed from a conducting material and be placed in electrical contact with the anode electrode 212.

Figure 3:
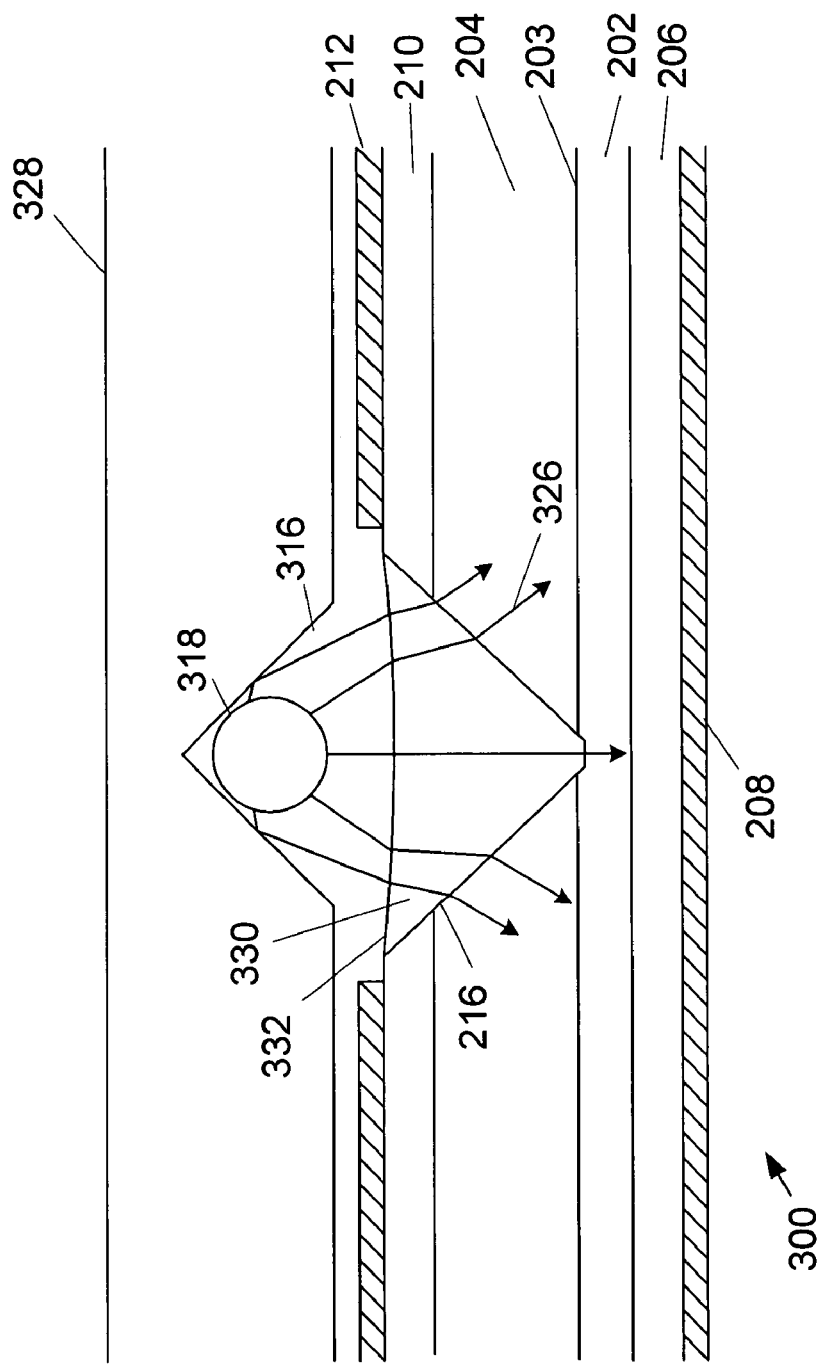
FIG. 3 schematically illustrates a cross-section through another embodiment of a light-activated thyristor with refractive direction of the triggering light, according to the present invention.

Another embodiment of a light activated thyristor 300 is schematically illustrated in FIG. 3. In the embodiment illustrated in FIG. 3, the light guide 318 is not disposed within the groove 216, but is held in the plate 328 above the anode electrode 212. The light guide 318 may be held in a groove 316 on the plate 328. The groove 216 in the thyristor 300 may be passivated and may also be filled with passivant 330, such as polyimide. The surface 332 of the material 330 filling the groove 316 may be profiled so as to preferentially refract the light 326 received from the light guide 318 in desired directions. The groove 216 may extend through the n-drift layer 204 to the p-base layer 202.

The plate 328 may be formed of electrically conducting material, such as a metal, or may have a metal coating on its lower surface, so as to form an electrical contact with the anode electrode 212 when pressed against the anode electrode 212.

Figure 4:
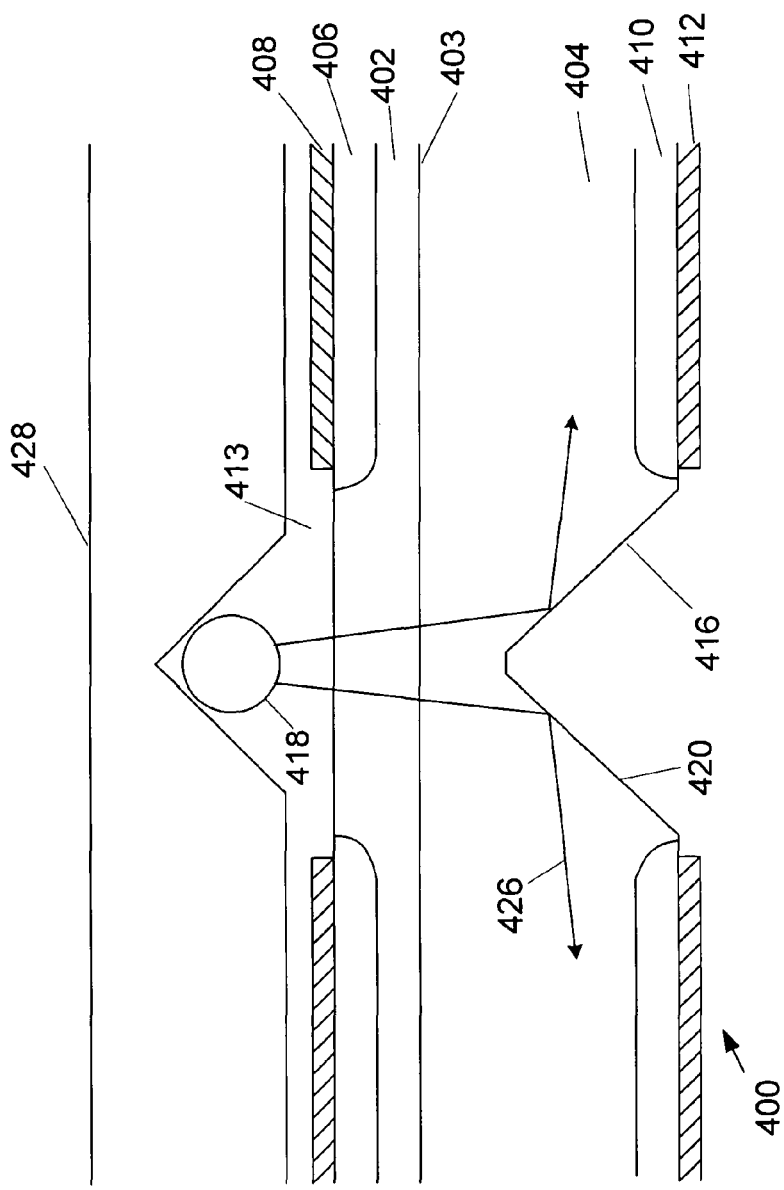
FIG. 4 schematically illustrates a cross-section through another embodiment of a light-activated thyristor with reflective direction of the triggering light, according to the present invention.

A groove having angled walls need not only be used for refracting the light, but may also be used to reflect light within the thyristor, for example as schematically illustrated in FIG. 4. The thyristor 400 has a p-base layer 402, and an n-drift layer 404 that form the main junction 403. The thyristor 400 also has a semiconductor anode layer 410 with an anode electrode 412, and a semiconductor cathode layer 406 with a cathode electrode 408.

The light guide 418 is held above an aperture 413 in the cathode electrode 408. The light guide 418 may be held above the thyristor 400 by a plate 428. The aperture 413 permits light 426 from the light guide 418 to enter the thyristor 400 through the p-base layer 402 and into the n-drift layer 404. There is typically a large difference in the refractive index between the semiconductor material and the passivant on the groove wall 420, and so the critical angle for total internal reflection within the thyristor 400 is relatively low. This results in a substantial fraction of the light 426 incident on the groove 416 being totally internally reflected within the thyristor. Thus, light 426 from the light guide 418 may be deflected by the groove 416 along the semiconductor layers. An anti-reflective coating (not shown) may be deposited over the aperture 413.

Figure 5:
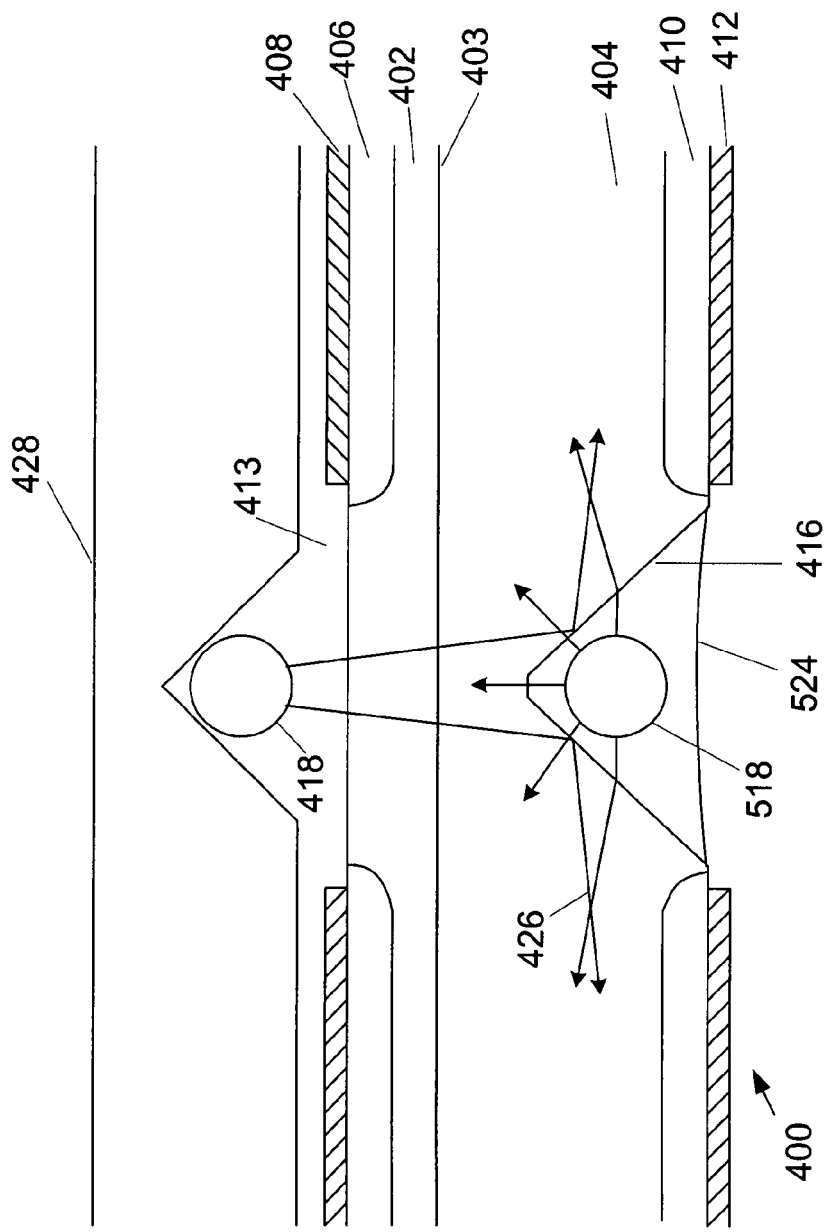
FIG. 5 schematically illustrates a cross-section through another embodiment of a light-activated thyristor with refractive and reflective direction of the triggering light, according to the present invention.

The groove 416 may also contain a light guide 518 that directs additional light into the thyristor 500, for example as schematically illustrated in FIG. 5. The groove 416 may be back-filled with a material 524 that transmits the light emitted from the light guide 518, for example a polyimide passivant. It will be appreciated that the fibers 418 and 518 need not be positioned directly through the device from each other, but may be offset from each other along the thyristor.

Figure 6A:
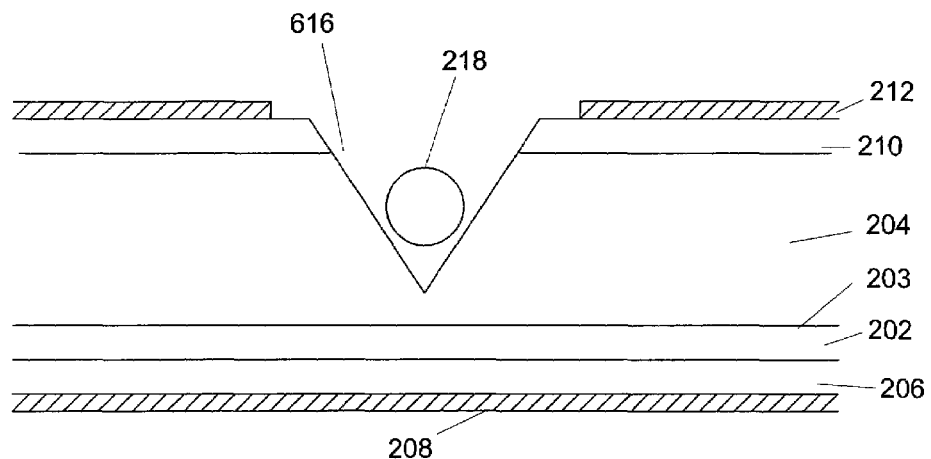
FIGS. 6A–6C schematically illustrate cross-sections of grooves of different geometries in a light-activated thyristor, according to different embodiments of the present invention.

Different shapes of grooves may be formed in the thyristor for receiving light from the light guide. For example, FIGS. 2–5 show grooves having symmetrically sloped sides, with a flat bottom portion. Such a groove shape may be achieved in an etching process by terminating the non-isotropic etch before the two sloped walls meet each other. By letting the non-isotropic etch process self terminate, a V-shaped groove 616 may be formed, for example as illustrated in FIG. 6A. A V-shaped groove may also be formed using a cutting tool.

Figure 6B:
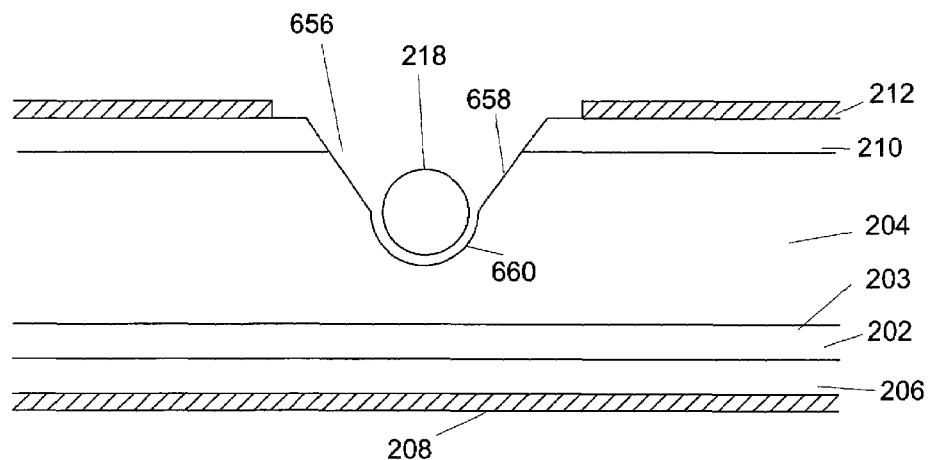

In another embodiment, the groove 656 may have sloped side walls 658 and have a rounded bottom portion 660, for example as schematically illustrated in FIG. 6B. The rounded bottom portion 660 may have a radius sufficient to accept the light guide 218. A groove 656 having this profile may be formed, for example, by initially performing a non-isotropic etch to form the sloped side walls 658, terminating the non-isotropic etch once the sloped side walls 658 have reached a desired depth, and then performing an isotropic etch on the bottom surface. The groove 656 may also be formed using a cutting tool having the desired cutting profile.

Figure 6C:
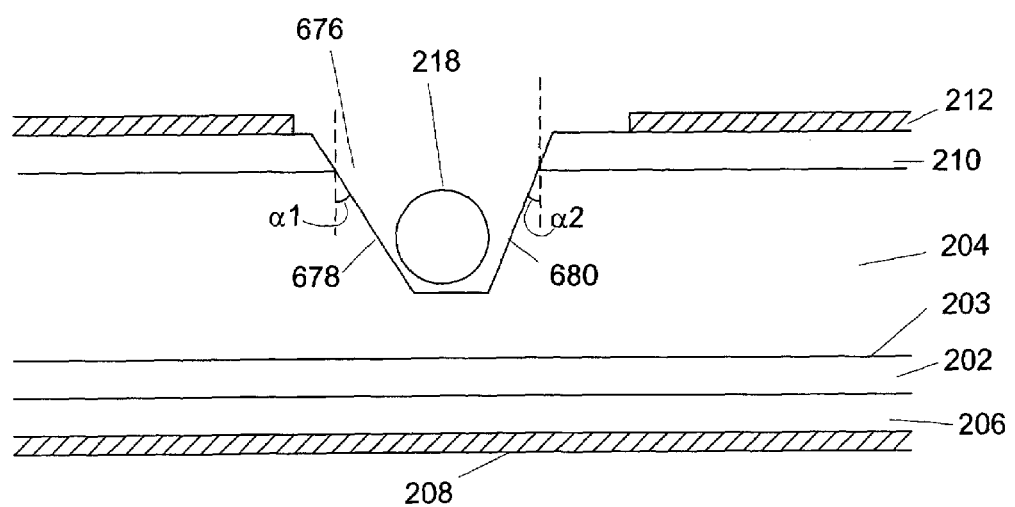
Figure 7:
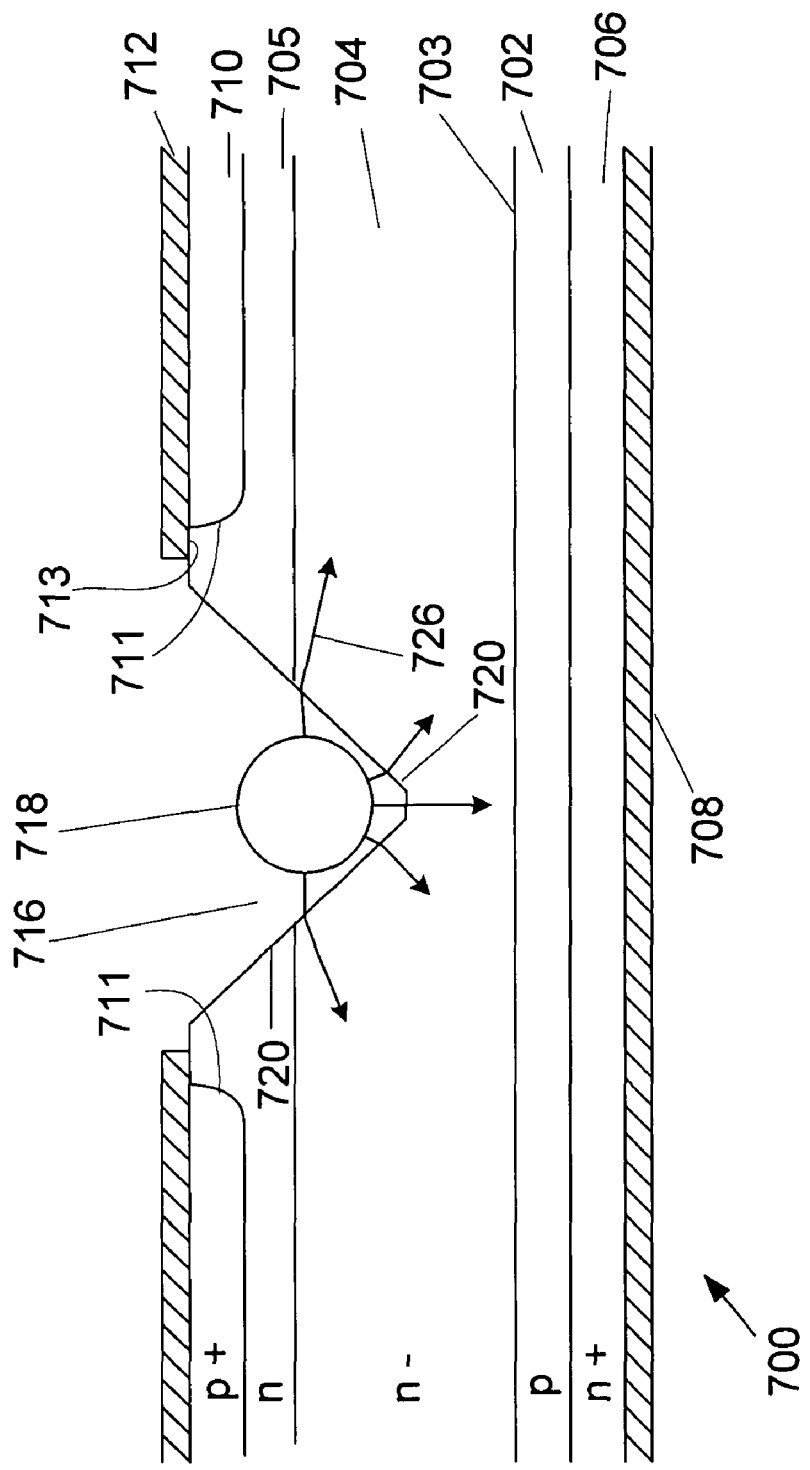
FIG. 7 schematically illustrates an embodiment of a semiconductor structure having a groove, according to principles of the present invention.

The groove need not be symmetrical, and may be formed with asymmetrical sides, for example as schematically illustrated in FIG. 6C. In this embodiment, the groove 676 has two sloped side walls 678 and 680 that form different angles, $\alpha 1$ and $\alpha 2$, with respect to the layers, for example semiconductor anode layer 210. An asymmetric groove may be formed, for example, using a cutting tool having an asymmetric cutting profile. When the groove is illuminated with light, the light is typically absorbed exponentially within the semiconductor material of the switch. Since the absorption of photons creates electron-hole pairs within the semiconductor, the current density is highest near the groove, where the greatest amount of light is absorbed. This may lead to excessive heating of the silicon and possible damage. The current density at the edge of the metal/semiconductor interface may be many times higher than the average current density. One approach to reducing the current density close to the groove wall is schematically illustrated in FIG. 7, which shows a semiconductor switch 700, such as a thyristor, having a p-type base layer 702 and an n-type drift layer 704 that form the main blocking junction 703. An n-type emitter layer 706 forms a junction with the other side of the p-base layer 702 and is connected to the cathode electrode 708. The p+ semiconductor anode layer 710 lies above the n-drift layer 704. The n-drift layer 704 may include a relatively high n-doped buffer layer 705.

The p+ anode layer 710 may be overcoated with a metallic layer forming the anode electrode 712. An aperture in the anode electrode 712, opening to a groove 716 in the switch 700 is provided to receive light into the switch 700 for activation to the conducting on-state.

According to this approach, the ends 711 of the anode layer 710 do not reach to the groove 716, and so the anode layer 710 is separated from the groove 716 by the n-drift layer 704. The n-doped buffer layer 705 may separate the anode layer 710 from the groove 716. Accordingly, the ends 711 of the anode layer 710 may be positioned below the anode electrode 712. This placement of the ends 711 of the anode layer 710 reduces the current density at the edge 713 of the metal/semiconductor interface, which is now above the n-drift layer 704 or the n-buffer layer 705. Positioning the ends 711 of the anode layer 710 away from the groove wall 720 may be achieved through various lithographic process steps implemented when fabricating the thyristor 700.

Figure 8:
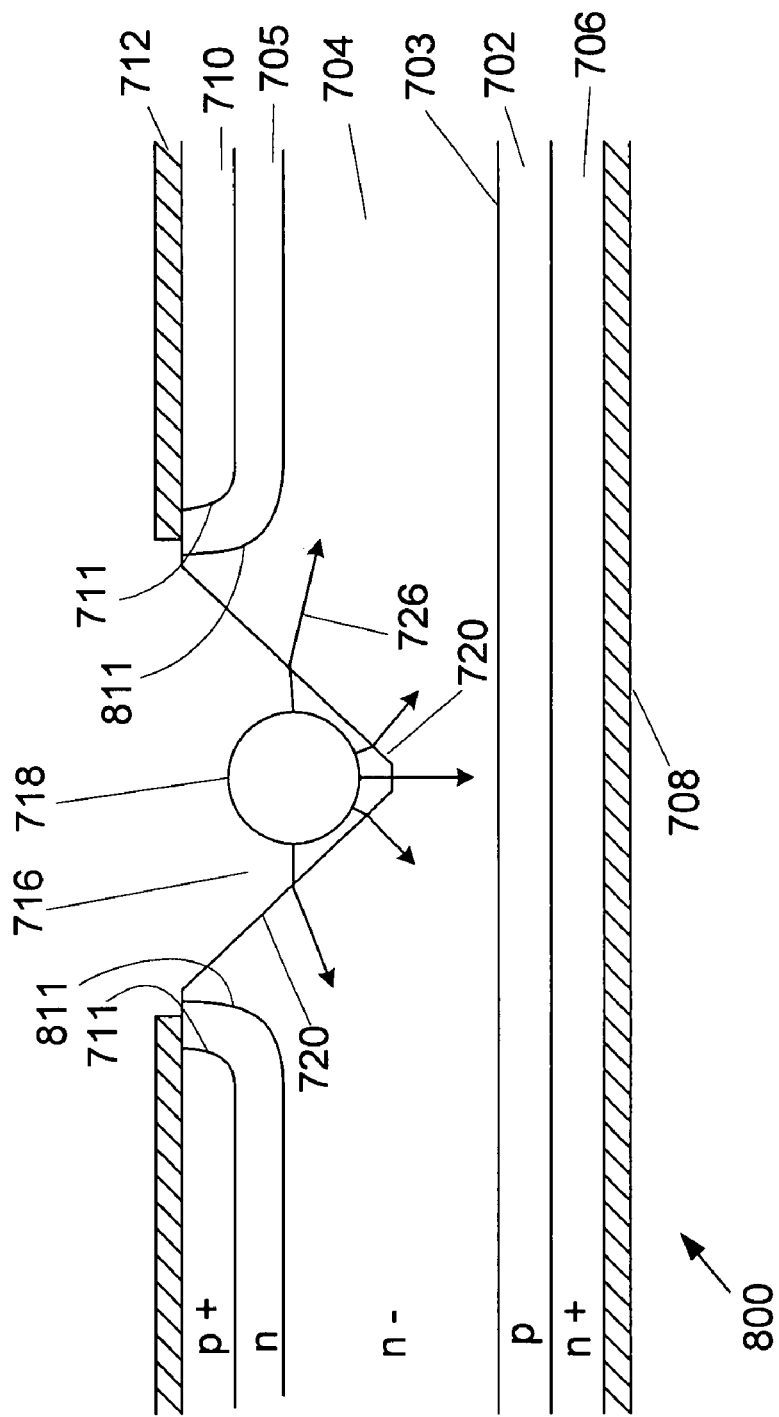
FIG. 8 schematically illustrates another embodiment of a semiconductor structure having a groove, according to principles of the present invention.

In addition, steps may be taken to reduce the magnitude of the electric field at the groove wall 720, which reduces the chance of electrical breakdown on the groove wall. One approach is schematically illustrated in FIG. 8, which shows that the buffer layer 705 does not extend all the way to the groove wall 720. Instead, the ends 811 of the buffer layer 705 terminate the buffer layer 705 before the groove wall 720, and so the low-doped region of the n-drift layer 704 separate the relatively high n-doped buffer layer 705 from the groove wall 720. In the illustrated embodiment, the ends 811 of the buffer layer 705 lie between the anode electrode 712 and the groove wall 720. The ends 811 of the buffer layer 705 may also lie below the anode electrode 712.

The ends 811 of the buffer layer 705 may be positioned away from the groove wall 720 through the use of various lithographic process steps implemented when fabricating the thyristor 800.

Figure 9:
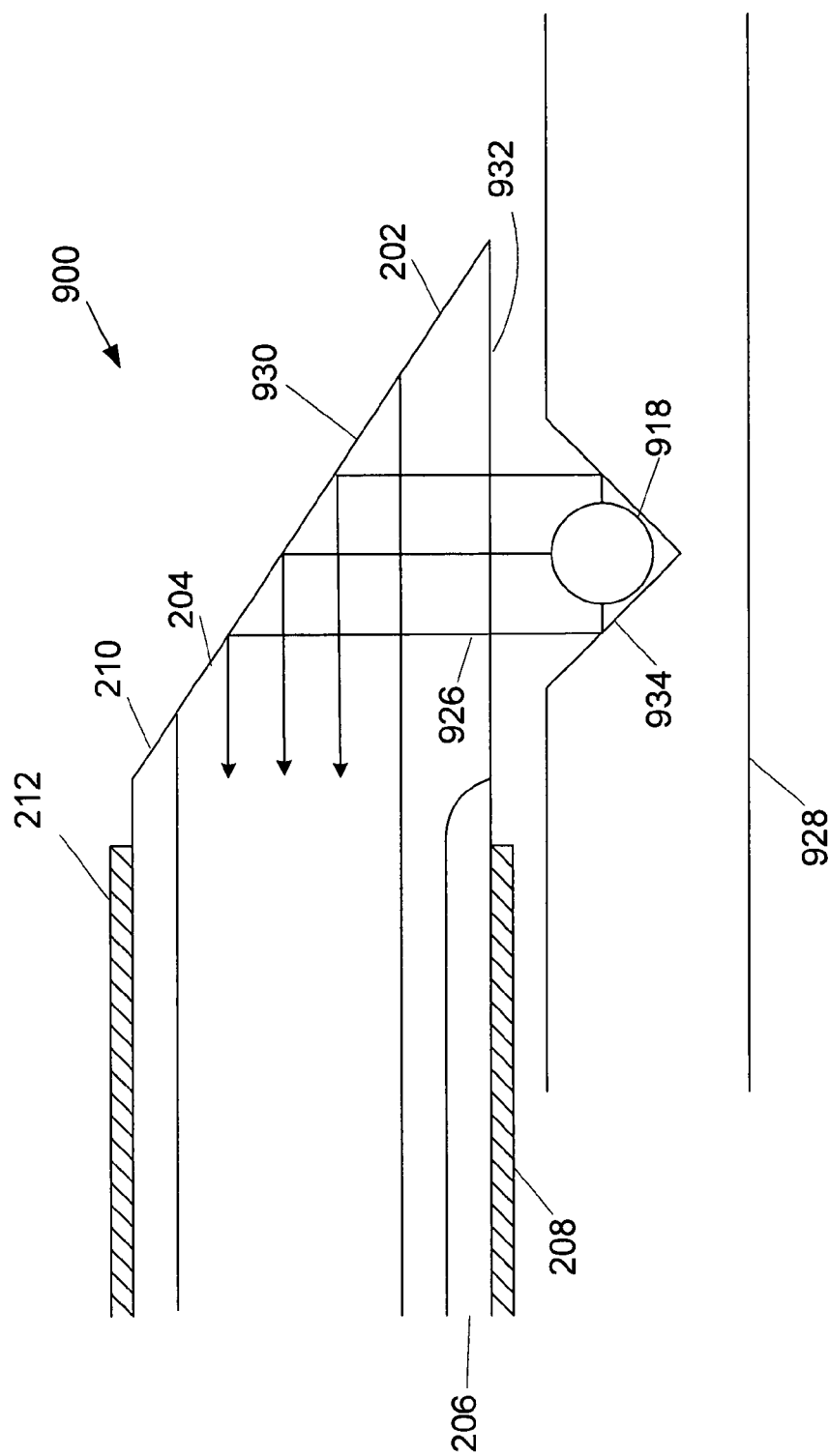
FIG. 9 schematically illustrates a cross-section of a light-activated thyristor showing direction of the illuminating light off the thyristor edge, according to an embodiment of the present invention.

Another approach for introducing light into the thyristor is schematically illustrated in FIG. 9, which shows a cross-section through an edge 930 of the thyristor 900. The edge 930 is beveled so as to increase the ability to hold voltage between the anode and cathode electrodes 212 and 208. The edge 930 is typically beveled at to lie at an angle of between 20° and 45° relative to the thyristor axis. The edge 930 may be passivated, for example with a polyimide.

The cathode electrode 208 does not extend all the way to the beveled edge, leaving a semiconductor window 932, through which light 926 from the light guide 918 may enter the thyristor 900. In the illustrated embodiment, the light guide 918 is held in a groove 934 in a mounting plate 928, although the light guide 918 may also be mounted relative to the thyristor using other approaches.

Some of the light 926 from the light guide 918 enters the thyristor 900 through the window 932, which may be anti-reflection coated, and is totally internally reflected at the edge surface 930. This enables the generation of carrier pairs close to the edge of the electrodes and, therefore, may aid in achieving high conduction through the thyristor faster than if the current has to spread laterally to the edge of the electrodes.

It will be appreciated that many of the processes and techniques described above are not restricted to use in a thyristor, but may also be used with different types of optically activated semiconductor switches that may have different numbers of semiconductor layers. For example, they may be used with transistor devices or with diode devices. Furthermore, the semiconductor switch device need not be based on silicon, but may be based on another type of semiconductor material, for example gallium arsenide or silicon carbide.

Diode devices are often used where the switch on-time is relatively short, for example in the nanosecond regime. The regenerative conducting characteristics of a thyristor are typically to supply the desired electrical pulse: where the pulse length is short, there is little time for the majority of the electrons and holes injected by the cathode layer (n+) and anode layer (p+) to diffuse across the p-base or n-region during the time that the current is conducted through the switch. Therefore, since the anode and cathode semiconductor regions are unable to supply carriers during the short current pulse, a simpler switch that is still capable of conducting the desired current pulse may omit the anode and cathode semiconductor regions. The diode is one example of such a device.

The diode may be a simple p-n diode or a p-i-n diode. A positive voltage is applied between the cathode and anode, so that the switch blocks the flow of current. The in situ absorption of photons under optical activation results in the creation of a population of electrons and holes that conducts so long as carriers are injected into the diode junction. One of the differences between optically activating a p-n diode and a p-i-n diode is that, in the p-i-n diode, the electric field punches through to the cathode before the electric field becomes large enough at the p-n junction to cause significant carrier generation by avalanche. In the p-n diode, on the other hand, avalanching frequently occurs at the p-n junction before the electric field punches through to the cathode. The electric field profile in the p-i-n diode is similar to that of an asymmetrical thyristor while the electric field profile in a p-n diode has an electric field profile similar to that is a symmetrical thyristor.

Figure 10:
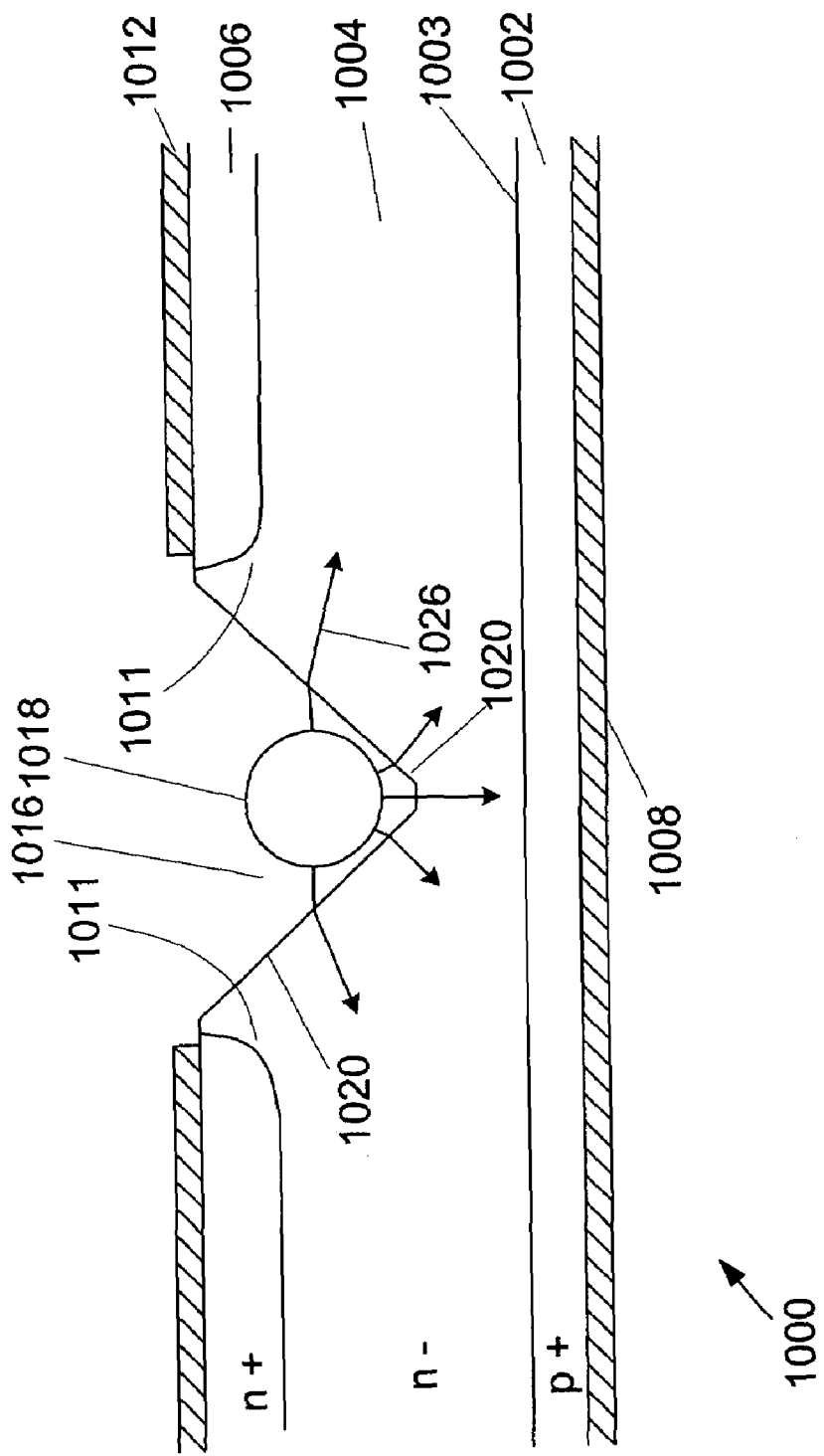
FIG. 10 schematically illustrates an embodiment of an optically activated diode semiconductor switch, according to principles of the present invention.

Once the diode is optically triggered, the electron current flows from the anode to the cathode, while the hole current flows from the cathode to the anode. A groove may be placed in the diode to aid in efficient coupling of the activation light into the diode. One particular embodiment of a p-i-n diode switch 1000 is schematically illustrated in FIG. 10. The diode switch 1000 is formed between an anode layer 1002 and a cathode layer 1006. In the p-i-n diode, an n-drift layer 1004 lies between the anode and cathode layers 1002 and 1006. The n-drift layer 1004 has a lower doping than the cathode layer 1002. The junction 1003 that holds off the applied voltage is formed between the n-drift layer 1004 and the anode layer 1002. An anode electrode 1008 is formed over the anode layer 1002 and a cathode electrode 1012 is formed over the cathode layer 1006.

A groove 1016 enters the cathode side of the switch 1000 for accessing the interior of the switch 1000 for optical activation. The illustrated embodiment includes a light guide 1018 in the groove 1016. Light 1026 exits the side of the light guide 1018 and passes into the switch 1000 through the groove wall 1020.

Other approaches of illuminating the switch 1000 may be used. For example, the source of light may be placed within the groove 1016, or the light may be transmitted into the groove 1016 in free space, rather that within a light guide. Also, an aperture in the anode electrode may permit activation light to pass into the switch 1000 from the anode side and reflect off the groove walls 1020 into the semiconductor material. This last approach has similarities to the illumination approach discussed with respect to FIG. 4. In another approach, the activating light may be internally reflected into the switch 1000 off an end bevel, in a manner similar to that discussed with respect to FIG. 9.

The groove 1016 may be a simple V-groove, or may be a groove with vertical side walls with either a rounded or a flat bottom. The groove 1016 need not be symmetrical and may take on various shapes.

It will be appreciated that many of the different embodiments discussed above may also be implemented in a device having doping that is opposite from that previously discussed. For example, a thyristor of a type like that discussed with reference to FIG. 2 is commonly fabricated in an n-doped silicon material, where the n-drift layer 204 uses the material of the original wafer, and the other layers 202, 206, 210 and 205 are formed by doping the wafer from one side or the other. The device may be formed from a wafer that has original p-type doping, instead of n-type doping, for example with boron doping. One particular embodiment of a thyristor fabricated in such a manner is schematically illustrated in FIG. 11, which shows a semiconductor switch 1100, such as a thyristor, having an n-type base layer 1102 and a p-type drift layer 1104 that form the main blocking junction 1103. A p-type emitter layer 1106 forms a junction with the other side of the n-base layer 1102 and is connected to the anode electrode 1108. The n+ semiconductor cathode layer 1110 lies above the p-drift layer 1104. The p-drift layer 1104 may include a relatively high p-doped buffer layer 1105.

The n+ cathode layer 1110 may be overcoated with a metallic layer forming the cathode electrode 1112. An aperture in the cathode electrode 1112, opens to a groove 1116 in the switch 1100 to receive light or, in some embodiments, the light source 1118 itself, for activating the switch 1100 to the conducting on-state. In the illustrated embodiment, the groove 1116 extends through the p-drift layer 1104 and the blocking junction 1103, and at least into the n-base layer 1102.

In the illustrated embodiment, the ends 1111*a* of the cathode layer 1110 do not reach to the groove 1116, and so the cathode layer 1110 may be separated from the groove 1116 by the p-doped buffer layer 1105. Accordingly, the ends 1111 *a* of the cathode layer 1110 may be positioned below the cathode electrode 1112. Positioning the ends 1111*a* of the cathode layer 1110 away from the groove wall 1120 may be achieved through various lithographic process steps implemented when fabricating the switch 1100.

Furthermore, although it may do so, the buffer layer 1105 need not extend all the way to the groove wall 1120. Instead, the ends 1111*b* of the buffer layer 1105 may terminate the buffer layer 1105 before the groove wall 1120, and so the low-doped region of the p-drift layer 1104 separates the relatively high p-doped buffer layer 1105 from the groove wall 1120. In the illustrated embodiment, the ends 1111b of the buffer layer 1105 lie between the cathode electrode 1112 and the groove wall 1120. The ends 1111b of the buffer layer 1105 may also lie below the cathode electrode 1112. The ends 1111b of the buffer layer 1105 may be positioned away from the groove wall 1120 through the use of various lithographic process steps implemented when fabricating the switch 1100.

It will be appreciated that other embodiments of semiconductor switch, for example those other embodiments illustrated herein may also be formed using p-doped material.

As noted above, the present invention is applicable to light-activated, semiconductor devices. The present invention permits the introduction of light deep into the semiconductor switch device to switch large values of current quickly, while at the same time maintaining the ability to hold off high voltages. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A semiconductor switch device for activation by light of a predetermined wavelength, comprising a semiconductor switch comprising:
   a first n-doped layer;
   a first p-doped layer forming a switch blocking junction where in contact with the first n-doped layer, a switch axis lying perpendicular to the switch blocking junction; and
   a groove having a light refracting side wall extending into the first n-doped layer from a side of the n-doped layer opposite from the switch blocking junction, at least a portion of the light refracting side wall being disposed non-parallel to the switch axis;
   wherein the first n-doped layer and the first p-doped layer substantially lie within an absorption depth from the groove, the first n-doped lever and the first p-doped layer comprising a material having a band gap and the absorption depth being a function of the band gap and the wavelength of the light.

2. A device as recited in claim 1, wherein the switch device is a diode, and comprising a first electrode layer disposed over the first n-doped layer and a second electrode layer disposed over the first p-doped layer.

3. A device as recited in claim 2, wherein the switch device is a p-i-n diode and the first n-doped layer comprises an n-drift portion forming the junction with the first p-doped layer and comprises an n-buffer layer between n-drift portion and the first electrode layer.

4. A device as recited in claim 1, wherein the switch device is a thyristor, the first p-doped layer being a p-base layer, and the first n-doped layer being an n-drift layer, and further comprising a semiconductor anode layer disposed on a side of the n-drift layer away from the switch blocking junction and a semiconductor cathode layer disposed on a side of the p-base layer away from the switch blocking junction.

5. A device as recited in claim 4, wherein the semiconductor anode layer has no edges forming the side wall of the groove.

6. A device as recited in claim 4, wherein the n-drift layer extends between the semiconductor anode layer and the side wall of the groove.

7. A device as recited in claim 4, wherein the n-drift layer includes an n-buffer layer.

8. A device as recited in claim 7, wherein the n-drift layer extends between the n-buffer layer and the side wall of the groove.

9. A device as recited in claim 7, wherein the semiconductor anode layer has no edges forming the side wall of the groove.

10. A device as recited in claim 9, wherein the n-drift layer extends between the n-buffer layer and the side wall of the groove.

11. A device as recited in claim 4 wherein the n-drift layer extends between the semiconductor anode layer and the groove wall.

12. A device as recited in claim 1, wherein the first n-doped layer comprises a high n-doped region and a low n-doped region between the high n-doped region and the first p-doped region, the switch blocking junction being formed between the low n-doped region and the first p-doped region, the low n-doped region extending between the high n-doped region and the groove.

13. A device as recited in claim 1, further comprising a light source disposed to direct light into the switch via the groove.

14. A device as recited in claim 13, wherein the light source comprises a light guide to couple light from the light source into the switch.

15. A device as recited in claim 14, wherein the light guide is disposed within the groove.

16. A device as recited in claim 13, wherein the light source is mounted to a plate positioned proximate the switch so as to illuminate the groove.

17. A device as recited in claim 16, wherein the groove enters the switch from a first side and the light source is disposed to the first side of the switch, wherein the light entering the switch from the light source is refracted at the side wall.

18. A device as recited in claim 17, wherein the switch comprises a window to permit light entering a second side of the switch opposing the first side to reflect light at the groove side wail.

19. A device as recited in claim 13, further comprising a plate disposed above the groove to reflect light from the light source to the semiconductor switch.

20. A device as recited in claim 19, wherein the plate comprises an electrically conducting material in electrical contact with an electrode of the semiconductor switch.

21. A device as recited in claim 19, wherein a lower surface of the plate facing the semiconductor switch contains a recess, the light source being at least partially contained within the recess.

22. A device as recited in claim 1, wherein the groove extends from the first n-doped layer into the first p-doped layer.

23. A device as recited in claim 1, wherein the groove is a V-groove.

24. A device as recited in claim 1, wherein the groove has sloped side walls and has a flat bottom portion.

25. A device as recited in claim 1, wherein the groove has sloped side walls and a rounded bottom portion.

26. A device as recited in claim 1, wherein the groove has first and second sloped walls, the first sloped wall forming a first angle with the switch axis and the second sloped wail forming a second angle with the switch axis, a magnitude of the first angle being different from a magnitude of the second angle.

27. A device as recited in claim 1, wherein the side wall lies at an angle relative to the switch axis of between 10° and 45°.

28. A device as recited in claim 1, further comprising a unit to generate light having an optical output coupled to a plurality of light guides, the light guides being coupled to illuminate the switch.

29. A device as recited in claim 28, wherein the light guides are associated with respective grooves on the switch.

30. A device as recited in claim 28, wherein the unit comprises a laser diode array and the light guides include optical fibers coupled to respective emitters of the laser diode array.

31. A device as recited in claim 1, wherein the switch comprises a beveled edge, light entering the switch in a direction substantially parallel to the switch axis and being totally internally reflected by the beveled edge into the switch.

32. A device as recited in claim 1, wherein the groove terminates in the first n-doped layer away from the first p-doped layer.

33. A semiconductor switch for activation by light of a predetermined wavelength, comprising:
    a first p-doped layer;
    a first n-doped layer forming a switch blocking junction where in contact with the first p-doped layer, the switch blocking junction being substantially perpendicular to a switch axis;
    a groove having a side wall, the side wall being disposed at least in the first n-doped layer and at a non-zero angle relative to the switch blocking junction and to the switch axis; and
    means for refracting light absorbable by the switch at the side wall;
    wherein the first n-doped layer and the first p-doped layer substantially lie within an absorption death from the groove, the first n-doped layer and the first p-doped layer comprising a material having a band gap and the absorption depth being a function of the band gap and the wavelength of the light.

34. A switch as recited in claim 33 wherein the switch further comprises a beveled edge, light entering the switch being totally internally reflected by the beveled edge into the switch.

35. A switch as recited in claim 33, wherein the side wall extends from the first n-doped layer into the first p-doped layer.

36. A switch as recited in claim 33, wherein the first n-doped layer comprises a first sub-layer having a relatively high n-doping and a second sub-layer having a relatively low n-doping, the switch blocking junction being formed between the second sub-layer and the first p-doped layer.

37. A light-activated semiconductor device comprising:
    a plurality of switch sections, each of the switch sections comprising:
        a first p-doped layer;
        a first n-doped layer forming a main switch blocking junction with the first p-doped layer, the first n-doped layer and the first p-doped layer comprise material having a band gap; and
        a groove extending into at least a portion of the first n-doped layer from a side of the n-doped layer away from the switch blocking junction, at least a portion of the groove being a light refracting side wall disposed non-parallel and non-perpendicular to the switch blocking junction; and
    a light pulse source optically coupled to each of the grooves of the switch sections, the light pulse source having a predetermined wavelength substantially matched to the band gap for substantially uniformly illuminating the first n-doped layer and the first p-doped layer of each of the switch sections.

38. A light-activated semiconductor device as recited in claim 37, wherein the light source comprises light guides respectively disposed within the grooves of the switch sections.

39. A light-activated semiconductor device as recited in claim 37, wherein the grooves of the switch sections comprise respective apertures for admitting light from the light source into the grooves.

40. A light-activated semiconductor device as recited in claim 37, wherein the light source comprises light guides disposed in a plate, the light guides respectively being optically coupled to the grooves.

41. A light-activated semiconductor device as recited in claim 37, further comprising;
    a plurality of additional switch sections having end bevels; and
    means for illuminating the additional switch sections through the end bevels.

42. A light-activated semiconductor device as recited in claim 41, wherein the light source comprises light guides respectively disposed within the grooves of the switch sections and in proximity to the end bevels of the additional switch sections.

43. A light-activated semiconductor device as recited in claim 41, wherein the switch sections and the additional switch sections comprise respective apertures for admitting light from the light source into the grooves and the end bevels.

44. A light-activated semiconductor device as recited in claim 41, wherein the light source comprises light guides disposed in a plate, the light guides respectively being optically coupled to the grooves and the end bevels.

45. A light-activated semiconductor device as recited in claim 37, wherein the grooves respectively extend through the first n-doped layers and the main switch blocking junctions into at least a portion of the first p-doped layers.

46. A light-activated semiconductor device as recited in claim 37, wherein the grooves respectively terminate in the first n-doped layers away from the first p-doped layers.

47. A light-activated semiconductor device as recited in claim 37, wherein each of the switch sections further comprises:
    a first electrode layer disposed proximate the side of the first n-doped layer away from the switch blocking junction, the groove extending through the first electrode layer; and
    a second electrode layer disposed proximate a side of the first p-doped layer opposite the switch blocking junction;
    wherein and diode is formed.

48. A light-activated semiconductor device as recited in claim 37, wherein the first n-doped layer comprises a n-buffer layer and an adjacent n-drift layer, the n-drift layer forming the blocking junction with the first p-doped layer, further comprising:

a first electrode layer disposed proximate the side of the first n-buffer layer opposite the switch blocking junction, the groove extending through the first electrode layer; and a second electrode layer disposed proximate a side of the first p-doped layer opposite the switch blocking junction;

wherein a p-i-n diode is formed.

49. A light-activated semiconductor device as recited in claim 37, wherein the first p-doped layer comprises a p-base layer and the first n-doped layer comprises an n-drift layer forming the blocking junction with the p-base layer, further comprising:

an anode layer disposed proximate the side of the n-drift layer away from the switch blocking junction, the groove extending through the anode layer;

a first electrode layer disposed proximate a side of the anode layer away from the switch blocking Junction, the groove extending through the first electrode layer;

a cathode layer disposed proximate a side of the p-base layer away from the switch blocking junction; and a second electrode layer disposed proximate a side of the cathode layer away from the switch blocking junction;

wherein a thyristor is formed.

50. A light-activated semiconductor device as recited in claim 37, wherein the light pulse source comprises a diode-laser pumped solid state laser.

51. A light-activated semiconductor device as recited in claim 37, wherein the light pulse source comprises a laser diode.

52. A light-activated semiconductor device as recited in claim 37, wherein the light pulse source comprises a laser diode array.

53. A light-activated semiconductor device as recited in claim 37, wherein:

the first n-doped layer and the first p-doped layer are formed in silicon having a band gap at about 1.1 eV; and the wavelength of the light pulse source is in a range of about 1.06 µm to about 1.2 µm.

* * * * *